United States Patent [19]

Studlien

[11] 4,295,116
[45] Oct. 13, 1981

[54] PRESSURE TRANSDUCER

[75] Inventor: Vance D. Studlien, Stow, Mass.

[73] Assignee: Bofors America, Inc., Edison, N.J.

[21] Appl. No.: 100,384

[22] Filed: Dec. 5, 1979

[51] Int. Cl.³ .............................................. G01L 1/22
[52] U.S. Cl. .................... 338/4; 29/610 SG; 338/42
[58] Field of Search ........................ 338/2–5, 338/42, 36; 228/254, 179; 73/720, 721, 726, 727, 708; 29/610 SG

[56] References Cited

U.S. PATENT DOCUMENTS

| | | | |
|---|---|---|---|
| 3,008,109 | 11/1961 | Starr | 338/330 X |
| 3,247,719 | 4/1966 | Chelner | 73/726 |
| 3,289,134 | 11/1966 | Laimins et al. | 338/4 |
| 3,303,450 | 2/1967 | Brackett, Jr. et al. | 338/2 |
| 3,453,873 | 7/1969 | Lambert | 338/2 X |
| 3,486,223 | 12/1969 | Butera | 228/254 X |
| 3,527,099 | 9/1970 | Herceg | 338/3 X |
| 4,116,075 | 9/1978 | Ort | 73/708 |

Primary Examiner—C. L. Albritton
Attorney, Agent, or Firm—James E. Mrose

[57] ABSTRACT

Sensing and electrical-signal characterization of fluid pressures is effected by a miniature precision transducer manufacturable at low cost from a combination of a pair of sub-assemblies, one of which consists of a single-piece metal transducer element having a flanged body with a blind-hole port leading from a mechanical pressure fitting to the inner side of a transverse thin diaphragm which forms the blunt flat end of the body except for a bonded covering of both the machined outer side of the diaphragm and its coplanar annular rigid rim by a foil-type rosette strain gage bridge array and its layer of supporting insulation. Both the contact tabs and certain abradable resistance components of the flat foil bridge array are distributed about and disposed in overlying adjacent relation to the rigid annular rim of the body, where there is accessibility for convenient testing and adjustment and electrical contacting before a second sub-assembly, which serves as a seal and electrical connector, is fitted over the closed end of the body in a protective and electrically-coupled relation to the gaged diaphragm.

16 Claims, 13 Drawing Figures

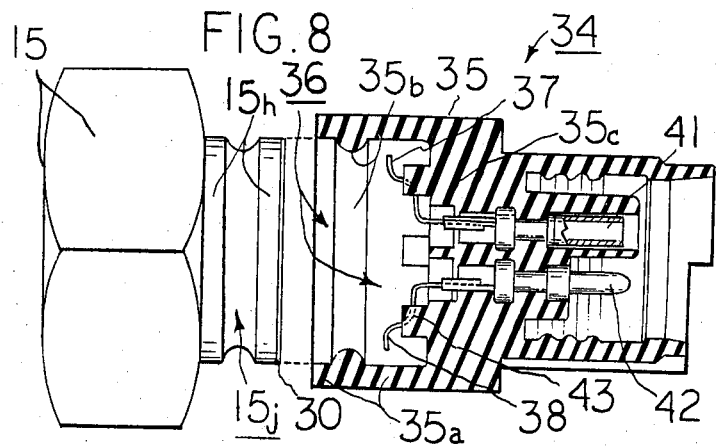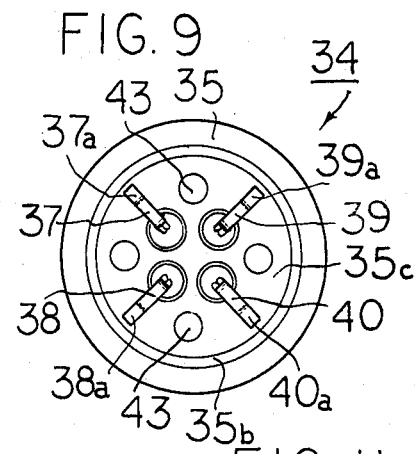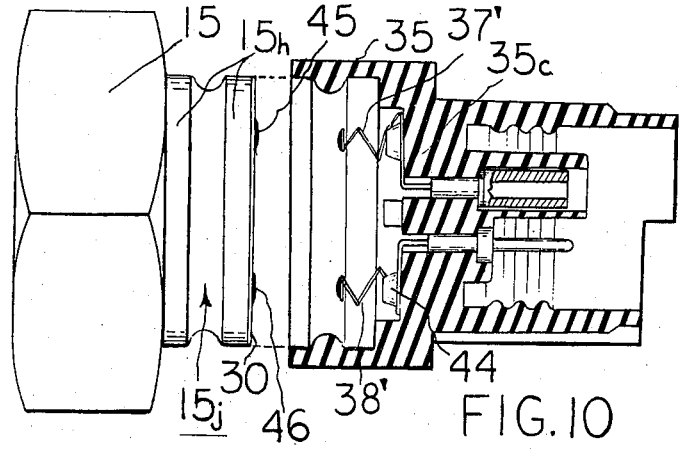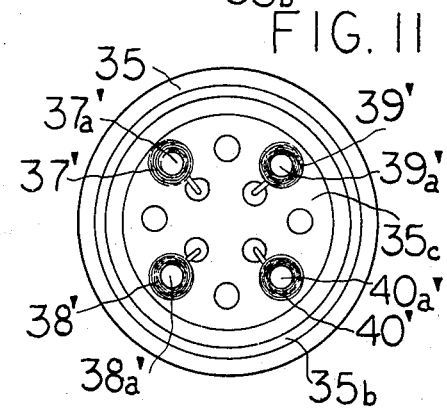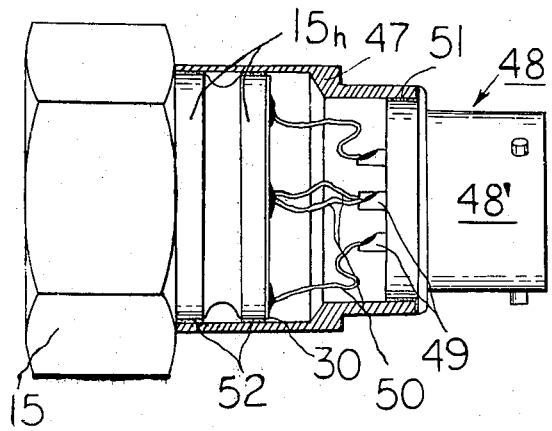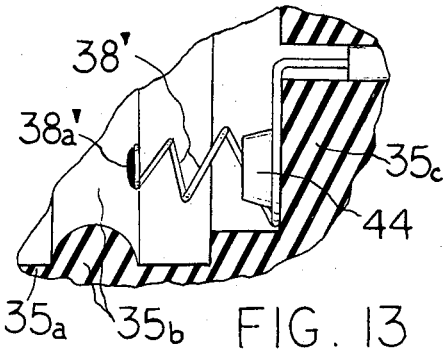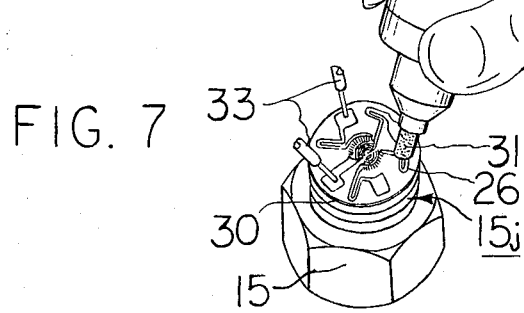

PRESSURE TRANSDUCER

BACKGROUND OF THE INVENTION

The present invention related to improvements in strain-gage fluid-pressure transducers, and, in one particular aspect, to novel and improved diaphragm-type pressure cells of low-cost uncomplicated construction which lend themselves to highly-automated fabrication in a miniature standardized configuration to sense and precisely signal fluid pressures stably and over wide ranges.

Strain-gage pressure transducers have long been known in a variety of forms wherein pressure-related deformations of diaphragms, thin-walled tubing, and the like, have been converted into related changes in resistance of gages disposed in arms of an electrical bridge network. An early development, as disclosed in U.S. Pat. No. 2,327,935—Simmons, utilized a strain-sensitive filament about a hollow thin-walled stud which expanded as the result of explosive impingements of fluid pressure forces upon a piston carried at the end of the stud. Simultaneous responses to both compression and tension strains on one side of a diaphragm were also realized in sophisticated pioneer work according to U.S. Pat. No. 2,400,467—Ruge, where a thick-rimmed gaged diaphragm capped a pipe exposed to pressures being sensed. A thin-walled internally-pressurized and externally-gaged tube was shown in the pressure gauge of U.S. Pat. No. 2,477,026—Wenk, Jr., et al, and a diaphragm bonded to the end of a pressure-probe tube and gaged on its interior was disclosed in U.S. Pat. No. 2,629,801—Warshaw and U.S. Pat. No. 3,305,818—Brueggeman et al. Electrical connections with the gages centered on the flexible portions of a diaphragm have also been facilitated, through use of extended flexible tab portions of a gage carrier, in U.S. Pat. No. 3,899,766—Mermelstein.

Underlying the present teachings is the recognition that it is the difficulties of producing pressure transducers economically, and in quantity, with reliable and stable high-precision characteristics, rather than any basic fault with the known general designs of such devices, which is a major obstacle to their more successful exploitation in a great variety of applications where they could serve to much advantage. In the case of the popular diaphragm-type transducers, for example, it can be quite troublesome to fabricate and install the diaphragms, if they are not integral parts of a transducer structure, and even when they are, it can likewise be awkward and onerous to locate and bond and calibrate minute gage networks on small surfaces which are not conveniently accessible. If the devices are to be of high technical quality, and yet inexpensive, it should also be possible to standardize their outputs readily and to compensate their gaging circuitry, without involving time-consuming, complex or painstaking skilled manufacturing operations. Moreover, it then becomes important to make electrical connections with and to protectively house and seal the sensitive gaged diaphragms without adversely affecting reliability of the devices and without detracting from their overall simplicity and ease of manufacture. In accordance with this invention, such advantageous features and aspects of improvement are promoted by way of a main transducer sub-assembly in which the diaphragm forms the integral bottom for a blind hole recessed into a flanged body from a pressure fitting, the outer side of the diaphragm and its coplanar annular rim forming an obstructed flat free end of the body. Diaphragm thickness may thus be mechanically adjusted readily from that end, to adapt the unit for optimum responses to selected ranges of pressures, and both the diaphragm and its coplanar rim are fully covered by a very thin insulating layer atop which foil gage elements are secured in position over the diaphragm and certain foil tabs and abradable compensation strips are secured in position over the stiff annular rim. Outwardly away from the flat diaphragm, and extending not beyond its flat end, is a peripheral cover-mounting shoulder onto which a second cooperating sub-assembly may be fitted. The latter includes a hollow connector member which may be cupped over the flat free end of the first sub-assembly and provides anchoring for flexible electrical connections contacting the rim-mounted tab-like terminals for the gages. In a version wherein the transducer reference pressure is to be that of a near vacuum, the connector member is rigid and tightly sealed after evacuation; in another expression, the connector is of rubber and snap-locks over the transducer body.

SUMMARY OF THE INVENTION

In one preferred embodiment of this invention, an improved miniature precision pressure-transducer assembly includes a small single-piece metal body into which a blind hole is recessed from an end where a threaded pressure-fitting connection serves to couple it with a site exhibiting the fluid pressure which are to be monitored. The opposite free end of the body is flat and unobstructed, being comprised of the outside of a thin diaphragm formed by the material which closes the blind hole and of the coplanar thick and rigid annular rim which surrounds that diaphragm. Bonded across that free end atop an insulating layer is a foil-gage bridge network wherein arcuate and radial gage strands overlie the diaphragm and both sets of enlarged connection tabs and abradable compensation strands overlie the annular rim surfaces. A hexagonal-nut flange is fashioned about the body nearer its pressure-fitting end, and the periphery nearer the flat free end with the diaphragm is shaped to mate within and support a connector-cover assembly. The latter assembly anchors a group of electrical connectors which are coupled with the gages through the rim-mounted connection tabs, and it is in a sealing and protective capping relationship over the free end of the transducer body.

Machining of transducer bodies for devices intended for operation over different ranges of pressure may be the same except for the last material-removal over their flat ends, which mechanical trimming will establish the critical final diaphragm thicknesses. After the diaphragm and its coplanar stiff annular rim and thus prepared, and the pre-formed foil unit of gages, tabs and compensation strands has been bonded in place over them, the transducer sub-assembly is electrically compensated in respect of such characteristics as its span and bridge balance by way of abrasion of its compensation strands. Optimum adjustments are not possible once the foil unit has been covered by a cooperating connector, but, before then, the free and unobstructed flat gaged end of the body is fully exposed and accessible, and the body may then be pressurized and the rim-mounted contact tabs may be engaged by electrodes associated with bridge-responsive instrumentation circuitry of generally known form. With cell pressures and temperatures being variable, and with electrodes being temporarily applicable to enable electrical measurements, both the compensation strands for bridge-balance and span compensations are also exposed and may be abrasively modified in resistance to achieve optimum corrections while they are rigidly backed by the mounting rim and thus cannot affect the central diaphragm and gages.

Accordingly, it is one of the objects of the present invention to provide a unique and advantageous strain-gage fluid-pressure transducer which lends itself to economical and uncomplicated manufacture in miniature sizes and with stable precision performance characteristics, the main sensing element of which includes an integral diaphragm which is the closure for a blind hole and which on its exterior is unobstructed and coplanar with a relatively wide annular rim, both the exposed exterior to the diaphragm and its annular rim being overlaid with a foil unit including diaphragm gages and contact tabs and abradable compensation strands which overlie its rim.

A further object is to provide a strain-gage pressure transducer comprised of a pair of readily-assembled mating subassemblies, one of which is substantially monolithic body having an integral stiff-rimmed flat diaphragm with exposed gages, connecting tabs and abradable compensation strands disposed accessibly at one end, and the other of which mounts electrical contacts and cabling and fits protectively in capping relation to the sensitive gaged diaphragm portion of the first subassembly.

Still further, it is an object to provide for the improved low-cost manufacture of precision pressure transducers in which abrasion of conveniently-disposed compensation resistances promotes quality of performance, and to provide foil units for such transducers which have a central gage cluster cooperating with annularly-arrayed contact tabs and abradably-adjustable compensation strands.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 7 portrays the same gaged sensor sub-assembly with foil compensation strands undergoing controlled abrading caused by a motorized eraser, and with temporary electrical test contacts being engaged with its connection tabs;

FIG. 8 illustrates an improved fluid-pressure sensor together with a cooperating resilient snap-fitting spring-contact housing and connector sub-assembly;

FIG. 9 is a view looking toward the housing end of the housing and connector sub-assembly in FIG. 8;

FIG. 10 illustrates an improved fluid-pressure sensor together with a housing and connector sub-assembly wherein the spring contacts are helical and wherein pre-tinned regions on both the spring contacts and foil unit promote sound electrical connections;

FIG. 11 is a view looking toward the housing end of the housing and connector sub-assembly in FIG. 10;

FIG. 12 illustrates an improved fluid-pressure sensor in a mated and bonded sealed relation with a rigid housing and connector sub-assembly, the circuit connections being by way of pre-soldered wiring; and FIG. 13 provides an enlarged cross-sectioned detail of a spring-contact sub-assembly such as that in FIGS. 10 and 11, featuring a helical spring-contact element.

DETAILED DESCRIPTION OF THE PREFERRED EMBODIMENTS

Figure 1:
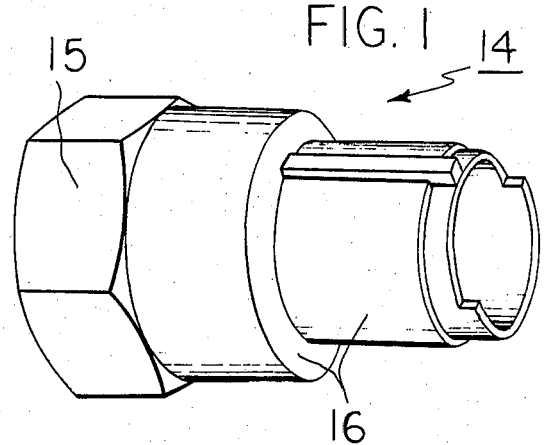
FIG. 1 is a perspective view showing the general form of an improved miniature fluid-pressure transducer unit fabricated from a pair of sensor and connector sub-assemblies.
Figure 2:
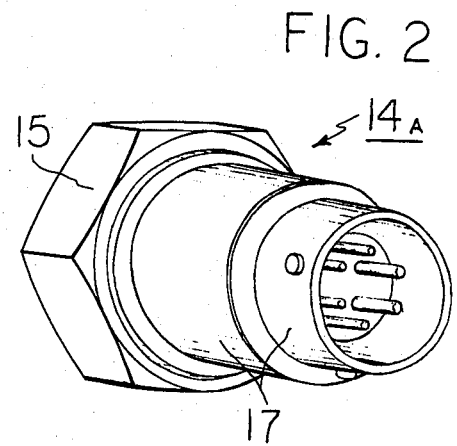
FIG. 2 is a perspective view showing a similar pressure transducer unit involving a different connector sub-assembly.

Having reference to the drawings, wherein like reference characters designate identical or corresponding components and units throughout the several views, and more particularly to FIG. 1 thereof, one version of a fluid-pressure transducer, 14, constructed in accordance with these teachings, includes a hexagonally-flanged metal body portion 15 mated with a molded-rubber portion 16 which serves both as a housing or cover and as an electrical connector. The transducer 14A in FIG. 2 similarly incorporates a body portion 15 which is substantially the same as that in FIG. 1, but is somewhat differently mated with a rigid housing and electrical connection unit 17, the latter being adhesively sealed about and bonded with the sensor body portion 15 in accordance with practices discussed in detail later herein. Unit 17 is preferably evacuated, such that known low-pressure or near-vacuum reference pressure conditions will be maintained on one side of a sensor diaphragm which is to have unknown to-be-measured pressures exerted on its opposite face.

Figures 3, 4, 5:
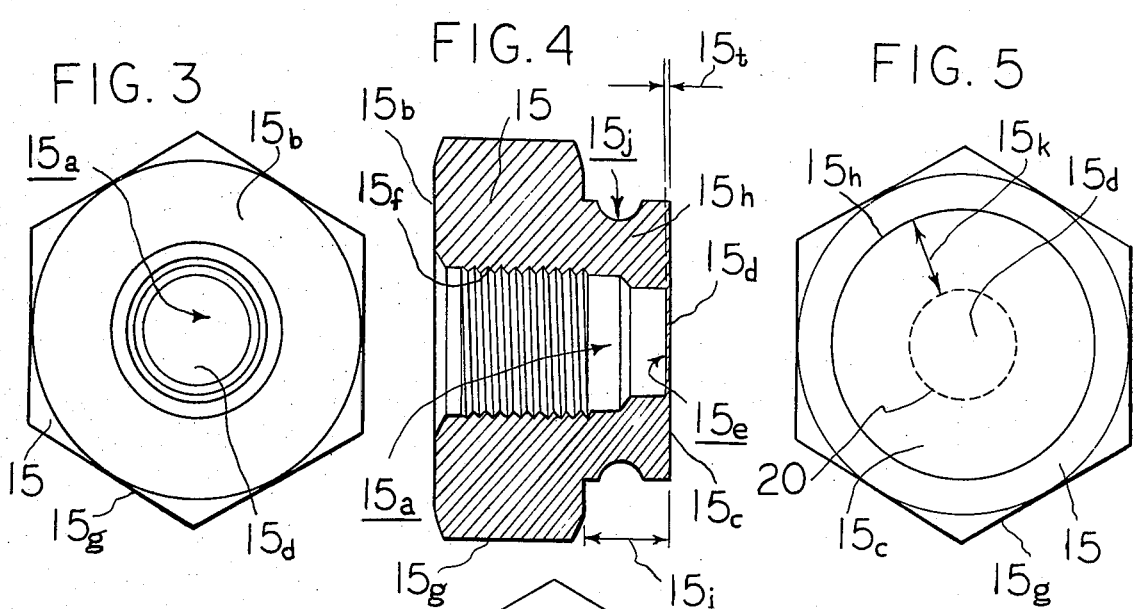
FIGS. 3, 4 and 5 are a front end, cross-sectioned transverse, and back end views of a preferred single-piece body about which the improved sensor sub-assembly may be constructed.

As is represented in the related views appearing in FIGS. 3-5, the sensor body portion 15 is a sturdy one-piece metal member into which a central opening 15a is recessed from one end, 15b, stopping just short of the opposite flat end, 15c so that it leaves a thin integral flat diaphragm, 15d, at that site. Such blind-hole production is preferably by way of convenient and precise circular-machining operations, the inner face 15e of the diaphragm being left quite flat and parallel with end 15b. Internal threading 15f near that open end serves a pressure-fitting function, for securely coupling the small-volume inner cavity of the body with a source of fluid pressures which are to be measured, and the surrounding flange 15g allows tightening with the aid of a suitable tool. At the body end 15c, the thin diaphragm 15d is integral with a relatively thick and rigid annular rim 15h which extends back toward the open end for a distance 15i sufficient to form an external cylindrical section onto which a cup-shaped part of a unit such as 16 or 17 (FIGS. 1 and 2) may be fitted. About midway therealong, that cylindrical section exhibits a groove 15j of substantially semicircular cross-section, in which a cooperating inner rib of unit 16 may become lodged and locked, as is discussed later herein. Importantly, the annular rim 15h has a radial thickness 15k which is sufficient to prevent its becoming enough distorted by internal pressures or normal external ambient mechanical forces so as to affect the sensitive diaphragm and cause related measurement errors. Further, the outer end surface of the rim is made substantially coplanar with the exposed side of the diaphragm, and its aforesaid radial thickness 15k is likewise sufficient to provide rigid backing for certain electrical contact tabs and abradable compensation strands which are to be mounted there as part of a foil unit including strain gages for the diaphragm. However, before the gaging is performed, the intended diaphragm thickness, 15t, is established within a very close tolerance by outside machining of the entire body end 15c until the desired dimension is reached. That thickness predetermines what range of pressures will produce the optimum diaphragm deflections, for measurement purposes, and one single body configuration may therefore serve the needs of a variety of pressure ranges provided the final machining of the body ends is performed appropriately. In that connection, for example, the blind hole 15a in each body may first be accurately machined to a prescribed depth from open body end 15b, and a subsequent machining of the closed body end 15c down to a precise distance from end 15b will then necessarily yield a desired diaphragm thickness; or, some inner reference portion of the body, including the inside face of the diaphragm, may instead be engaged by a reference-position support to provide a gauge for regulation of thickness to which the diaphragm is machined. Typically, in such steel-body structures the diaphragms may be only a little over $\frac{3}{8}$ inch in diameter and the radial thickness of the annular rims slightly less than $\frac{1}{4}$ inch. The corresponding diaphragm thickness may vary from about 1/60 to 1/20 inch, for uses of the transducer with pressures from about 750 to 10,000 pounds per square inch.

Figure 6:
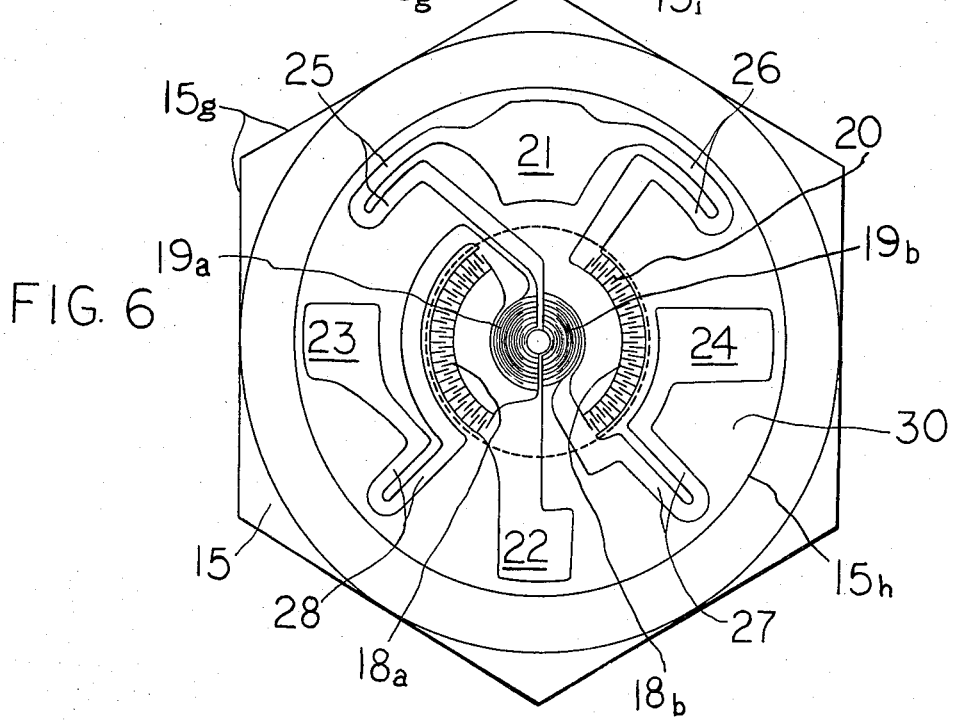
FIG. 6 provides a view corresponding to that of FIG. 5, on a relatively enlarged scale, and displaying a foil-type unit in place atop the rear diaphragm and rim surfaces of the body to effect gaging, electrical connecting, and electrical compensating.

Pressure-related deflections of diaphragm 15d are sensed by electrical-resistance type strain-gages which are next applied in overlying relation to outer exposed and readily-accessible surfaces of the diaphragm. In accordance with established practices, such gaging may respond to both compression and tensile strain, and the array depicted in FIG. 6 is that for a so-called "full" bridge wherein there are two outer groups of radially-oriented foil filaments, represented as 18a and 18b, responding to compression strains, and two inner groups of arcuately-oriented foil filaments, represented as 19a and 19b, responding to tensile strains. Diaphragm 15d is bulged outwardly under action of fluid pressure, with the result that there is concave curvature near its rim, causing the radial compression, and a central convex elastic distortion which causes the tension which may be sensed by the arcuately-disposed gage filaments. Dashed linework 20(FIGS. 5 and 6) locates the periphery of the diaphragm of the sensor body 15, and it should be noted that the four foil gages, 18a, 18b, 19a and 19b, all within that periphery, are integrally united with foil leads and with four relatively broad-area contact tabs 21-24 and with four hairpin-loop sets of resistance strands 25-29 disposed outside that periphery and in overlying relation to the coplanar flat end surfaces of the annular rim 15h. All of the aforesaid foil components are supported in common upon an exceedingly thin uniform-thickness circular carrier, 30, of insulating material, the latter being adhesively bonded directly to the diaphragm and rim across the flat body end 15c. The foil material supported on that carrier is exposed outwardly so that clear access is afforded for the making of electrical connections via tabs 21-24 and for the controlled abrasion of the strands 25-28 to effect electrical-circuit compensations. Well-known photoresist chemical etching processes for preparing foil gages are employed to fashion the entire foil unit, and not only that foil and carrier unit but also the thin layer of customary bonding material which holds it in place upon the diaphragm and body rim are so unsubstantial in relation to even the thinnest of intended transducer diaphragms that they cannot degrade the diaphragm responses.

Once the foil unit has been put into place at the body end 15c, the main pressure-sensing sub-assembly is essentially complete as a unified and substantially monolithic structure. However, before the device can be committed to accurate measurement applications in cooperation with the usual external instrumentation, it must have its bridge network carefully balanced and calibrated. For those purposes, the foil unit incorporates as an integral part thereof the four hairpin-shaped elongated loops of foil 25-28, which are disposed so that they will overlie the rigid rim surfaces and will be so solidly backed that the forces attending their mechanical abrasion cannot affect the diaphragm. Those small foil compensation loops may readily be reached by a motorized eraser-type abrasive member, such as member 31 which rotated in the chuck of a small motor 32 in FIG. 7. Further, the free and clear access which is afforded by the absence of any body protrusions beyond end 15c also allows temporary test probes such as 33, to be engaged with the connection tabs 21-24 and to thereby couple the foil unit with external instrumentation which will respond to its condition and permit calibration and/or balance and/or other compensations to be achieved. In the foil unit which has been chosen for illustration in FIG. 6, the input or excitation terminals are contacts 23 and 24, and the compensation loops 28 and 27 are respectively in direct series relationship with them. In turn, compensation loop 28 directly connects with the junction between radial-filament gage 18a and arcuate-filament gage 19a, the former being directly joined with output contact tab 22 and the latter being joined with the other output contact tab, 21, through compensation loop 25. Similarly, compensation loop 27 directly connects with the junction between radial-filament gage 18b and arcuate-filament gage 19b, the former also being directly joined with output contact tab 22 and the latter being joined with the outer output contact tab 21 through compensation loop 26. Accordingly, compensation loops 27-28 are split outside the bridge, in its input connections, where they may serve so-called "span" adjustment purposes, and compensation-loops 25-26 are within the bridge in bridge arms adjoining a common output terminal, where they may serve so-called "bridge balance" purposes. In preparation for such testing and compensation, the sub-assembly is preferably cycled in temperature and subjected to overpressure, to stabilize conditions. Then, with electrical excitation applied to the input tabs 23-24 and electrical output sensed by a conventional type of measuring instrument connected to output tabs 21-22, the bridge is balanced by erasure-type abrasion of one or both of its compensation loops 25 and 26, the rotating abrading eraser 31 being brought into abrading engagements with such loops, as required, to reduce the thickness or portions of the already-thin foil strands which make up the loops and to thereby raise the effective resistance which they insert into their bridge arms. The desired balancing condition of the bridge may thus be adjusted within desired limits, at selected temperatures. The compensation loops 23 and 24 are likewise adjustably increased in resistance, by similar abrasion, to vary the input voltage which is effective across the input junctions of the bridge gages and, thereby, to adjust the span of the output signals for a desired range of pressure responses to which the body sub-assembly is exposed. Where warranted, the foil unit may include or may be joined with compensation loops, generally like those at 25–28, which are specially made of alloy specifically different from that of the gages, for such purposes as those of more sophisticated temperature compensation; however, such loops should likewise be supported upon the stiff annular rim, where they can be adjusted by abrasion without interference with diaphragm operation and where their temperatures will tend to agree with those of the gages.

With its foil-unit adjustments completed, the sensor subassembly is then protectively enclosed at its gaged end, and a separable electrical connector arrangement is also provided to facilitate its electrical associations with input and output equipment at a pressure-measurement installation site. FIGS. 8 and 9 illustrate one preferred arrangement of such housing-connector provisions, in the form of a sub-assembly 34 which will snap-fit and lock itself in place over the grooved cylindrical fitting section of rim 15h of body sensor portion 15. There, a molded-rubber cylindrical body 35 for that sub-assembly exhibits a cylindrical cavity 36 at the end which is to mate with rim section 15h, and the surrounding tubular portion 35a bordering that cavity is radially thin enough to permit its elastic outward flaring as it is rather snugly slipped over the rim section. On its interior, tubular portion 35a exhibits an integrally-molded inwardly-projecting annular ridge or rim 35b having a substantially semi-circular cross-section which complements that of the groove 15j of the body portion, and that ridge is elastically pressed into and held in the groove by the tubular portion 35a. Although the open end of portion 35a quite readily flares out to allow the ridge 35b to ride over the outer end of body rim 15h and to seat itself in groove 15j when sub-assembly 34 and body 15 are being brought into fully-mated relationship, there is no comparable elastic flaring which can occur if it is sought to separate the joined sub-assemblies in the opposite axial sense. That is, once the ridge 35b takes up its seated position in groove 15j, it tends to remain firmly locked there because its easy release under axial pulling would require the tubular portion to expand in hoop-like fashion inwardly of it, where there is no open end but only a closing heavy inner wall 35c instead. Axial separation of the sub-assemblies is thus prevented, largely by the resistance of ridge 35b to shearing in the axial direction. Four bent leaf-spring electrical contacts, 37–40, are cantilevered within cavity 36 from pin and socket type electrical connectors, such as 41 and 42, molded in place and sealed with but extending through the wall 35c; at their opposite free outer ends, those connectors may be mated with matching connectors for a multi-conductor cable. Ends 37a–40a of the leaf contacts within cavity 36 are arrayed with ninety-degree angular spacing about the central axis of the sub-assembly, where they are disposed for engagements with the similarly-arrayed enlarged tabs 21–24 (FIG. 6) of a foil unit atop layer 30 at the flat end of the body portion 15. Bosses 43 protruding forwardly from wall 35c help to assure that the leaf contacts will remain in their intended separated positions, and keying markings on the two sub-assemblies (not shown) aid in aligning them so that the leaf contacts engage the tabs properly when they are fitted together. Adhesive may be applied to the rim groove 15j to secure the sub-assemblies in their intended angularly-fixed relationship, as well as to seal them. Preferably, the leaf-contact ends 37a–40a are pre-tinned with solder, as are also the intended contacting sites on gage tabs 21–24, and, after the two sub-assemblies are fitted together, a heat treatment of the entire transducer will fuse the abutting tinned surfaces together in firmly-united low-resistance soldered relationships which will not degrade under shock, vibration and other deleterious ambient conditions of use.

The modification represented in FIGS. 10, 11 and 13 is generally like that of FIGS. 8 and 9, and like components and features are therefore identified by the same reference characters. A specific difference, currently preferred, has to do with the four spring contacts carried forwardly of the wall 35c, those contacts being in the form of spirals 37'–40' of truncated-conical configuration and having their smaller forward ends capped with solder at 37a'–40a'. Those caps are disposed to engage pre-tinned solder masses such as 45–46 on tabs of the foil unit carried upon end layer 30 of body portion 15, and heat treatment as aforesaid fuses and soundly unites the spring contacts and foil-circuit tabs both electrically and mechancially. Spiral-form connectors are found to accommodate great compression without undue distortion and side-slipping as the sub-assemblies are brought together, and they promote excellent connections without exerting large forces which cannot be controlled and may damage the foil unit or fail to engage the tabs properly. The detail appearing in FIG. 13 illustrates the preferred inclusion of a relatively short truncated conical locator boss 44 for each spiral spring contact such as 38', the boss being molded to project forwardly from the face of wall 35c, and to make a snug fit with at least the first turn of the spiral. That arrangement aids further in preventing lateral displacements of the spring contacts, before the fusion of pretinned parts can be effected. There may in fact be many turns in the spiral contacts, rather than only a few as pictured.

Another preferred version of the pressure transducer, again based upon the same sensor body sub-assembly 15, is shown in FIG. 12 as including a rigid metal housing-connector sub-assembly having q tubular housing section 47 which fits over body section 15h in a housing relationship to the foil-covered end layer 30 and is in turn closed by a connector 48 having insulated lead-through contacts such as 49 which are sealed with the casing 48' of connector 48. A conventional external cable-connection fitting mates with casing 48' to couple with the contacts 49, and the latter are connected to foil-unit tabs such as 21–24 by way of soldered flexible leads 50. The latter leads may be permanently soldered into the intended conductive paths before the subassembly parts 47 and 48 are sealed with one another and with body portion rim 15h. In the latter connection, it is preferred that the joints 51 and 52 between parts 47 and 48 are between parts 47 and 15h, respectively, be relatively loose, with clearances of the order of 4–5 thousandths of an inch, and a filler-sealer-bonding material, such as an epoxy resin, is interposed in those joints. The resin fillings there are cured by baking of the transducer at a suitably high curing temperature in an oven under evacuated conditions, such that the resulting transducer device leaving the vacuum furnace will be well sealed and will maintain a reference near-vacuum pressure condition on the outside of its diaphragm.

It should be understood that the specific embodiments and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. A fluid-pressure transducer comprising a substantially rigid single-piece body having a recess therein from an open end thereof which is closed at its bottom by a substantially flat uniform-thickness integral diaphragm, the outer side of said diaphragm being substantially coplanar with the end of a relatively thick and substantially rigid annular rim of said body about said diaphragm, said recess having pressure-fitting means near said open end for coupling said recess and the inner side of said diaphragm with a site of fluid pressures which are to be sensed, and said coplanar outer side of said diaphragm and end of said annular rim being substantially unobstructed by any portions of said body extending beyond the plane thereof, and a substantially flat foil electrical network including strain gages and relatively broad-area contact tabs and conductive paths bonded in insulated overlying relation to said coplanar outer side of said diaphragm and said end of said annular rim, said gages being disposed in overlying relation to said diaphragm and said contact tabs being disposed in overlying relation to said end of said annular rim, and means making external electrical circuit connections with said gages through said contact tabs.

2. A fluid-pressure transducer as set forth in claim 1 wherein said foil network includes elongated flat foil strands disposed in overlying relation to said end of said annular rim and there exposed and accessible for mechanical abrasion which will increase effective electrical resistance thereof, said strands being in electrical-circuit connection with said gages through said conductive paths.

3. A fluid-pressure transducer as set forth in claim 2 further including a thin flat insulating carrier bonded in overlying relation to said coplanar diaphragm and rim and having said foil network thereon, and wherein said abradable foil strands are of relatively low resistance and are in half-loop sets each including a pair of closely-spaced strands joined at one end, said sets being laterally spaced from said tabs and strain gages atop said carrier.

4. A fluid-pressure transducer as set forth in claim 2 further including a thin flat insulating carrier bonded in overlying relation to said coplanar diaphragm and rim and having said foil network thereon, wherein said contact tabs on said carrier are disposed at predetermined spaced annular positions about said end of said annular rim, and wherein said means making electrical circuit connections with said gages through said contact tabs includes a sub-assembly adapted to fit over said rim and having a plurality of electrical connectors mounted therein, said sub-assembly further including means electrically connecting said connectors with said tabs.

5. A fluid-pressure transducer as set forth in claim 4 wherein said sub-assembly includes a tubular housing portion adapted to fit about said rim with a slight clearance, and further includes an electrical connector portion having electrical connectors extending therethrough and adapted to fit in closing relation to the end of the tubular portion opposite the end where it fits about said rim, and wherein said means electrically connecting said connectors with said tabs comprises flexible wires inside said tubular portion and extending from said connectors and soldered with said tabs, and further comprising solidfied bonding means filling the small clearances between said tubular portion and rim.

6. A fluid-pressure transducer as set forth in claim 5 wherein said tubular portion is metallic and substantially rigid, and wherein said solidified bonding means comprises thermosetting resin cured in place within said clearances and preserving a substantially evacuated reference pressure condition within said housing portion and at the outer side of said diaphragm.

7. A fluid-pressure transducer as set forth in claim 4 wherein said sub-assembly includes a tubular portion adapted to fit closely over said rim and a transverse wall portion closing said tubular portion and having said electrical connectors extending therethrough, and wherein said means electrically connecting said connectors with said tabs includes conductive resilient spring contacts fixed with said connectors and extending toward and into contacting engagements with said contact tabs when said tubular portion is fully mated about said rim.

8. A fluid-pressure transducer as set forth in claim 7 wherein each of said spring contacts is a substantially conically-shaped spiral winding of wire, and wherein said wall portion carries forwardly-projecting locating members about which at least the first turns of the spiral windings of said spring contacts are wound.

9. A fluid pressure transducer comprising a substantially rigid single-piece body having a recess therein from an open end thereof which is closed at its bottom by a substantially flat uniform-thickness integral diaphragm, the outer side of said diaphragm being substantially coplanar with the end of a relatively thick and substantially rigid annular rim of said body about said diaphragm, said recess having pressure-fitting means near said open end for coupling said recess and the inner side of said diaphragm with a site of fluid pressures which are to be sensed, and said coplanar outer side of said diaphragm and end of said annular rim being substantially unobstructed by any portions of said body extending beyond the plane thereof, a thin flat insulated carrier bonded in overlying relation to said coplanar diaphragm and rim, a substantially flat foil electrical network on said carrier and including strain gages and relatively broad-area contact tabs and conductive paths bonded in insulated overlying relation to said coplanar outer side of said diaphragm and said end of said annular rim, said gages being disposed in overlying relation to said diaphragm and said contact tabs being disposed in overlying relation to said end of said annular rim at a predetermined spaced angular positions thereabout, said foil network including elongated flat foil strands disposed in overlying relation to said end of said annular rim for exposure to and accessibility for mechanical abrasion which increases effective electrical resistance thereof, said strands being in electrical-circuit connection with said gages through said conductive paths, and means making external electrical circuit connections with said gages through said contact tabs and including a sub-assembly adapted to fit over said rim and having a plurality of electrical connectors mounted therein, said sub-assembly including a tubular portion adapted to fit closely over said rim and a transverse wall portion closing said tubular portion and having said electrical connectors extending therethrough, means electrically connecting said connectors with said tabs and including conductive resilient spring contacts fixed with said connectors and extending toward and into contacting engagements with said contact tabs when said tubular portion is fully mated about said rim, said tubular portion being of molded material having elastic properties of rubber, said rim having a substantially cylindrical periphery rearwardly of said end coplanar with said diaphragm, said cylindrical periphery having an annular depression therein forming a groove of substantially semi-circular cross-section, and said molded tubular portion having a substantially cylindrical interior surface near its open end with a ridge projecting inwardly therefrom, said ridge being of substantially cylindrical interior surface near its open end with a ridge projecting inwardly therefrom, said ridge being of substantially the same cross-section as said groove and being disposed to fit and become locked within said groove when the open end of said tubular portion is slipped over said rim, said transverse wall portion restraining said tubular portion from flaring outwardly and thereby preventing said ridge from separating from said groove once it is fitted into place.

10. The method of making a fluid-pressure transducer which comprises forming a flat-bottom blind hole in a substantially rigid metal body while leaving a relatively thick substantially annular rim about the hole, providing a pressurefitting coupling at the open end of the hole, shaping material of said body located beyond the bottom of the hole to yield at that closed end of the body only substantially flat coplanar surfaces including the outer side of said diaphragm and the surrounding end surfaces of the rim, providing a substantially flat foil electrical network including electrical-resistance strain gages and relatively broad-area contact tabs and conductive paths, bonding the foil network to the substantially coplanar surfaces outside the closed end of the body with the gages in overlying insulated relation to the diaphragm and with the contact tabs in overlying insulated relation to the end surfaces of the rim, and making external electrical circuit connections with the gages through the rim-mounted contact tabs.

11. The method as set forth in claim 10 wherein the shaping of material includes removing material at the closed end of the body until a desired thickness of the diaphragm is realized while at the same time preserving flat and coplanar the outer side of the diaphragm and surrounding end surfaces of the rim.

12. The method as set forth in claim 10 which includes providing elongated flat foil strands in the foil network in exposed overlying insulated relation to the end surfaces of the rim and in electrical association with the strain gages wherein resistance of the strands can effect compensation of characteristics of circuitry incorporating the gages, and mechanically abrading the strands to increase electrical resistance thereof while they overlie the end surfaces of the rim.

13. The method as set forth in claim 12 wherein making the external circuit connections includes capping the closed end of the body with a housing having a plurality of electrical connectors therethrough each supporting a pre-tinned spring contact in position for compressed engagement with a foil contact tab when the housing is fitted onto the body, pre-tinning the contact tabs, and heating the transducer after fitting the housing onto the body and thereby fusing together the engaged contact tabs and pre-tinned spring contacts.

14. A foil gage unit for bonded application to an exposed substantially flat end of a pressure transducer where a central thin circular diaphragm portion is on one side substantially coplanar with a relatively rigid annular rim, comprising a thin insulating carrier member having a substantially central cluster of foil gage elements thereon arranged as arms of a electrical resistance bridge, said foil gage elements being disposed to overlie the diaphragm of such a pressure transducer when said carrier is bonded to the flat end thereof exhibiting the diaphragm and annular rim, and a plurality of relatively broad-area foil contact tabs on said carrier having foil connection leads with said gages and arrayed in spaced angular relationship about said central gages and disposed radially outside said central gages in position to overlie and to be rigidly backed by the rigid annular rim of such a pressure transducer, said foil tabs being exposed on the outside of said carrier for abutting electrical-contact engagements with external connections.

15. A foil gage unit as set forth in claim 14 further including elongated foil compensation strands disposed on said carrier in position to overlie and to be rigidly backed by the rim of such a pressure transducer, said foil strands being exposed for mechanical abrasion which will increase effective electrical resistance thereof, and foil conductive paths on said carrier making electrical-circuit connections between said gages, tabs and compensation strands.

16. A foil gage unit as set forth in claim 15 wherein said compensation strands are of relatively low resistance and are in half-loop sets each including a pair of closely-spaced strands joined at one end, said sets being laterally spaced from said tabs and gages atop said carrier, wherein said gages are joined as arms of an electrical bridge by said conductive paths, and wherein said sets of abradable compensation strands include strands connected between said bridge and those of said tabs which serve to connect input electrical signals with said bridge and strands connected serially with strain gages within arms of said bridge, whereby said strands may be abraded to effect bridge balance and span characteristics of the bridge.

* * * * *